United States Patent
Mochizuki et al.

(10) Patent No.: US 6,793,727 B2
(45) Date of Patent: Sep. 21, 2004

(54) PIGMENT COMPOSITION AND INK COMPOSITION USING THE SAME

(75) Inventors: Akimitsu Mochizuki, Tokyo (JP); Shigeki Kato, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/438,979

(22) Filed: May 16, 2003

(65) Prior Publication Data

US 2003/0213408 A1 Nov. 20, 2003

(30) Foreign Application Priority Data

May 17, 2002 (JP) ........................................ 2002-142500

(51) Int. Cl.$^7$ ........................... C09B 67/50; C09C 1/22; C09D 11/00
(52) U.S. Cl. ................. 106/410; 106/31.78; 106/31.73; 106/31.69; 106/31.74; 106/31.86; 106/31.88; 540/137; 540/139; 540/140
(58) Field of Search ................................ 106/410, 411, 106/460, 31.73, 31.78, 31.69, 31.74, 31.86, 31.88; 540/137, 139, 140

(56) References Cited

U.S. PATENT DOCUMENTS

| | | | |
|---|---|---|---|
| 2,526,345 A | 10/1950 | Giambaivo | |
| 2,816,045 A | 12/1957 | Cooper et al. | |
| 2,902,384 A | 9/1959 | Meyer | |
| 5,282,896 A | * 2/1994 | Tsuchida et al. | ............ 106/411 |
| 5,472,490 A | 12/1995 | Sawamura et al. | |

FOREIGN PATENT DOCUMENTS

JP         410048862     * 2/1998

* cited by examiner

*Primary Examiner*—C. Melissa Koslow
*Assistant Examiner*—Shalie Manlove
(74) *Attorney, Agent, or Firm*—Wenderoth, Lind & Ponack, LLP

(57) ABSTRACT

A pigment composition which shows excellent flowability and stability with time, when used for an ink, and whose printed matter shows an excellent gloss, clearness, color strength and migrationfastness, and an ink composition, which pigment composition is formed of a phthalocyanine type pigment and a compound of the formula (1), $$P\text{-}[SO_3^-.Fe^{n+}/n]m \qquad (1)$$

(wherein P is a metal-free or metal phthalocyanine residue which may be substituted with a chlorine atom, a bromine atom or both of them, n is 2 or 3 and m is a number of 1 to 4).

4 Claims, No Drawings

PIGMENT COMPOSITION AND INK COMPOSITION USING THE SAME

FIELD OF THE INVENTION

The present invention relates to a pigment composition which shows excellent flowability and stability with time, when used for a gravure ink, a flexographic ink or an offset ink, and whose printed matter shows an excellent gloss, clearness, color strength and migrationfastness, and an ink composition using the same.

BACKGROUND OF THE INVENTION

Phthalocyanine type pigments have a clear color tone and high color strength and are excellent in various resistances such as weather fastness or chemical resistance, so that they are used in a wide range of uses. However, since they are hard to disperse in most cases, the value of a product is impaired in some uses.

Particularly, when a phthalocyanine type pigment is used in a gravure ink, a flexographic ink or an offset ink, an obtained ink tends to have a high viscosity, since it is required to disperse the pigment in a vehicle for an ink such that the pigment has a relatively fine particle diameter of 0.1 μm or less therein. Therefore, it is difficult to take out of the ink from an ink dispersion equipment and to transport it. In some cases, the ink undergoes gelation during storage and becomes unusable. Further, the pigment undergoes agglomeration in the ink and an agglomerate precipitates in some cases. Further, concerning a printed matter, decreases in gloss, clearness and color strength occur in some cases.

Various methods have been proposed for solving various problems like above. As a particularly effective method, there is a method in which an alkaline earth metal salt or organic amine salt of a copper phthalocyanine sulfonic acid is mixed with a phthalocyanine type pigment, as shown in publications of U.S. Pat. No. 2,526,345, JP-B-39-28884, JP-B-40-4143 and JP-B-3-132231. However, the flowability of an ink is still insufficient and a phenomenon occurs in which the viscosity of ink gradually increases during storage. In an ink-manufacturing system including passing the stage of a high-concentrated pigment dispersion, which system is widely adopted in ink makers, in particular, the production of an ink is interfered with in many cases, since the viscosity of the high-concentrated pigment dispersion is too high.

SUMMARY OF THE INVENTION

It is an object of the present invention to provide a pigment composition which shows excellent flowability and stability with time, when used for a gravure ink, a flexographic ink or an offset ink, and whose printed matter shows an excellent gloss, clearness, color strength and migrationfastness, and an ink composition using the same.

It is another object of the present invention to provide a pigment composition which is particularly excellent in flowability, i.e. low in viscosity, and has a little viscosity increase with time, and an ink composition using the same.

The present invention provides a pigment composition formed of a phthalocyanine type pigment and a compound of the formula (1), $$P\text{-}[SO_3^-.Fe^{n+}/n]m \tag{1}$$

wherein P is a metal-free or metal phthalocyanine residue which may be substituted with a chlorine atom, a bromine atom or both of them, n is 2 or 3 and m is a number of 1 to 4.

The present invention further provides a pigment composition according to the above, wherein the amount of the compound of the formula (1) per 100 parts by weight of the phthalocyanine type pigment is 0.1 to 30 parts by weight.

The present invention further provides an ink composition composed of the above pigment composition and a vehicle for an ink.

DETAILED DESCRIPTION OF THE INVENTION

The present inventors have found that a pigment composition formed of a phthalocyanine type pigment and a compound of the formula (1) shows excellent flowability and stability with time, when used for an ink, and whose printed matter shows an excellent gloss, clearness, tinting strength and migrationfastness. The present inventors have thus completed the present invention.

The present invention will be explained in detail hereinafter. The present invention is directed to a pigment composition which is characterized in that the pigment composition is formed of a phthalocyanine type pigment and a compound of the formula (1), and an ink composition using the same.

The phthalocyanine type pigment used in the present invention is a metal-free phthalocyanine or a metal phthalocyanine of copper, iron, nickel, cobalt, aluminum, zinc, tin, titanium, vanadium or the like. It may be substituted with a chlorine atom, a bromine atom or both of them. The maximum number of substitutable hydrogen atoms of the phthalocyanine compound is 16.

The compound of the formula (1) of the present invention is an iron salt of a metal-free or metal phthalocyanine sulfonic acid which may be substituted with a chlorine atom, a bromine atom or both of them. The metal of the metal phthalocyanine includes copper, iron, nickel, cobalt, aluminum, zinc, tin, titanium and vanadium. The present invention's effects can be obtained when the substitution number of a sulfonic acid group is 1 to 4 per 1 molecule of the phthalocyanine. It is preferably 1 or 2 in view of easiness of production as shown below. Further, iron ions of the iron salt may be bivalent ions or trivalent ions. In each case, the present invention's effects can be obtained.

The manufacturing method of the compound of the formula (1) of the present invention comprises a synthesis reaction of the metal-free or metal phthalocyanine sulfonic acid which may be substituted with a chlorine atom, a bromine atom or both of them and a salt-forming reaction of the above sulfonic acid compound and iron ions. The synthesis of the sulfonic acid compound can be carried out according to known methods. Examples of the methods include a method in which part or the whole of phthalic anhydride as a raw material is replaced with a sulfophtalic acid in the synthesis of a metal phthalocyanine according to the Wyler method, and a method in which a metal-free or metal phthalocyanine which may be substituted with a chlorine atom, a bromine atom or both of them is sulfonated with fuming sulfuric acid, chlorosulfonic acid, sulfur trioxide or the like. Of these, the sulfonation using fuming sulfuric acid is industrially advantageous in consideration of the degree of difficulty of the synthesis or prices of raw materials. The substitution number of a sulfonic acid group can be increased by increasing the ratio of sulfophtalic acid used or a sulfur trioxide component of fuming sulfuric acid. However, reaction conditions become extreme in these methods. Further, a yield loss is apt to occur because of the hydrophilic property of the sulfonic acid compound in a washing step using water which is carried out when the sulfonic acid compound is taken out from a reaction-termination liquid. In consideration of these points, the substitution number of a sulfonic acid group is preferably 1 or 2.

The salt-forming reaction is obtained by mixing the above sulfonic acid compound with an iron compound. Examples of the iron compound include iron [II] sulfate, iron [III] sulfate, iron [II] chloride, iron [III] chloride, iron [II] phosphate, iron [III] phosphate, iron [III] nitrate, iron [II] oxalate, iron [III] citrate and iron [II] ammonium sulfate. The mixing method is preferably a method in which the iron compound is added to an aqueous solution or aqueous suspension of the sulfonic acid compound, its alkaline metal salt or its ammonium salt and filtration and washing are carried out. However, the compound of the formula (1) can be also obtained by a method in which the iron-compound is mixed with any one of the sulfonic acid compound, its alkaline metal salt, its ammonium salt, or an alkaline earth metal salt or organic amine salt of a copper phthalocyanine sulfonic acid, as shown in publications of U.S. Pat. No. 2,526,345, JP-B-39-28884, JP-B-40-4143 and JP-B-3-132231, in the form of powders.

As for the mixing ratio of the phthalocyanine type pigment and the compound of the formula (1), the amount of the compound of the formula (1) per 100 parts by weight of the phthalocyanine type compound is 0.1 to 30 parts by weight, preferably 0.5 to 15 parts by weight. When the amount of the compound of the formula (1) is lower than the lower limit of the above range, the effects of the present invention can not be obtained. When it is larger, than the upper limit, an effect corresponding to an added amount can not be obtained.

As for the mixing method of the phthalocyanine type pigment and the compound of the formula (1), these components can be mixed in any one of the form of powders, the form of aqueous cakes or the form of aqueous suspensions. Further, the compound of the formula can be mixed in a manufacturing step of the phthalocyanine type pigment, such as a wet or dry pulverization step using a kneader, an attritor, a ball mill or a vibrating mill, a step of contact with an organic solvent or sulfuric acid, a purification or a surface treatment step.

The ink composition of the present invention is composed of the pigment composition of the present invention and a vehicle for an ink. Examples of the vehicle for an ink are as follows. In the case of a gravure ink or a flexographic ink, the vehicle for an ink includes resin mixtures of gum rosin, wood rosin, talloil rosin, lime rosin, rosin ester, a maleic resin, a polyamide resin, a vinyl resin, cellulose nitrate, cellulose acetate, ethyl cellulose, chlorinated rubber, cyclized rubber, an ethylene-vinyl acetate copolymer resin, a urethane resin, a polyester resin, an alkyd resin, gilsonite, a dammar resin, shellac, and the like. Otherwise, it includes a solution or emulsion formed of any one of the above resin mixtures and a solvent such as hydrocarbon, alcohol, ketone, ether, ester or water. As a vehicle for an offset ink, examples thereof include vehicles composed of a rosin-modified phenolic resin, a petroleum resin, an alkyd resin or a dry oil-modified resin of any one of these, a vegetable oil such as linseed oil, tung oil and soy oil, and a solvent such as normal paraffin, isoparaffin, aromatic, naphthene and α-olefin.

The ink composition of the present invention can be obtained by mixing and dispersing the pigment composition of the present invention and the vehicle for an ink with a dissolver, a high-speed mixer, a homomixer, a kneader, a flasher, a roll mill, a sand mill, an attritor, or the like.

EFFECT OF THE INVENTION

The pigment composition of the present invention is a product obtained by mixing the specific sulfonic acid compound with the pigment. The ink composition using the above pigment composition shows excellent flowability and its printed matter shows an excellent gloss, clearness, color strength and migrationfastness.

EXAMPLES

The present invention will be explained with reference to Production Examples, Examples and Comparative Examples hereinafter, in which "part" and "%" stand for "part by weight" and "% by weight" respectively.

Production Example 1

C.I. Pigment Blue 15 (15 parts) was dissolved in a 4% fuming sulphuric acid (200 parts), and the mixture was retained for 1 hour at 100° C., to carry out a sulfonation reaction. The resultant mixture was diluted with water (2,000 part), and then filtration and washing with water were carried out to obtain a monosulfonic acid compound. This filtrated cake was suspended in water (500 part), iron [II] sulfate-7-hydrate (7 parts) was added to the suspension, and filtration, washing with water and drying were carried out, to obtain a copper phthalocyanine monosulfonic acid iron salt [Compound A] (17 parts). The compound A corresponds to a compound of the formula (1) in which P is copper phthalocyanine, n is 2 and m is 1.

Production Example 2

Aluminum chloride (95 parts) and sodium chloride (20 parts) were dissolved at 170° C. and C.I. Direct Blue 86 (20 parts, active ingredient 70%) was added to the dissolved mixture. A chlorine gas (12 parts) was bubbled in the reaction mixture at the same temperature over 2 hours, to carry out a chlorination reaction. The reaction mixture was poured to water (2,000 parts) and then filtration and washing with water were carried out to obtain an aqueous cake of a monosulfonic acid compound. The cake was suspended in water (500 parts), iron [II] sulfate-7-hydrate (5 parts) was added to the suspension, and filtration, washing with water and drying were carried out, to obtain an octachloro-copper phthalocyanine monosulfonic acid iron salt [Compound B] (17 parts). The compound B corresponds to a compound of the formula. (1) in which P is octachloro-copper phthalocyanine, n is 2 and m is 1.

Production Example 3

C.I. Pigment Blue 75 (15 parts) was dissolved in a 15% fuming sulphuric acid (200 parts), and the mixture was retained for 1 hour at 100° C., to carry out a sulfonation reaction. The resultant reaction mixture was diluted with water (2,000 part), and then filtration was carried out to obtain a cake of a disulfonic acid compound containing diluted sulphuric acid. The cake was suspended in water (500 part), iron [III] sulfate-n-hydrate (15 parts) was added to the suspension, and sodium hydroxide was further added to adjust the pH to 7. Then, filtration, washing with water and drying were carried out, to obtain a cobalt phthalocyanine disulfonic acid iron salt [Compound C] (20 parts). The compound C corresponds to a compound of the formula (1) in which P is cobalt phthalocyanine, n is 3 and m is 2.

Production Examples 4

The following sulfonic acid compounds according to a conventional technique were synthesized in order to clarify the effects of the invention.

A copper phthalocyanine monosulfonic acid calcium salt [Compound D] (17 parts) was obtained in the same manner as in Production Example 1 except that iron [II] sulfate-7-hydrate (7 parts) used in the Production Example 1 was replaced with calcium chloride (3 parts). Further, a copper phthalocyanine monosulfonic acid dodecylamine salt [Compound E] (21 parts) was obtained in the same manner as in production Example 1 except that iron [II] sulfate-7-hydrate (7 parts) used in the Production Example 1 was replaced with dodecylamine acetate (6 parts).

An octachloro-copper phthalocyanine monosulfonic acid barium salt [Compound F] (20 parts) was obtained in the same manner as in Production Example 2 except that iron [II] sulfate-7-hydrate (5 parts) used in the Production Example 2 was replaced with barium chloride (4 parts).

A cobalt phthalocyanine disulfonic acid dodecylamine salt [Compound G] (28 parts) was obtained in the same manner as in Production Example 3 except that iron [III] sulfate-n-hydrate (15 parts) used in the Production Example 3 was replaced with dodecylamine acetate (13 parts).

Examples 1 to 3

Pigment compositions were prepared by mixing a phthalocyanine type pigment with any one of the sulfonic acid compounds obtained in Production Examples 1 to 3. One of the pigment compositions (20 parts), a vehicle for a gravure ink which had the following mixing ratio (80 parts) and 3 mm$\phi$ steel balls (300 parts) were mixed and the mixture was dispersed with a paint conditioner for 60 minutes to obtain a gravure ink. The gravure ink was measured for a viscosity with a B-type viscometer. Further, the gravure ink was printed on a triacetate film and the thus-obtained printed matter was measured for a gloss with a glossmeter. Further, the gravure ink was allowed to stand at 40° C. for 1 week and then the gravure ink was measured for a viscosity to evaluate stability with time.

Further, a test for migration fastness was carried out as follows. A nylon film was brought into intimate contact with the above-obtained printed matter and the nylon film with the printed matter was placed in boiling water for 1 hour. Then, a color transition degree to the nylon film was visually observed. When the color transition was small, it was evaluated as good.

| (Mixing ratio of vehicle for gravure ink) | |
| --- | --- |
| Cellulose nitrate (SS1/4) | 50 parts |
| Ethyl acetate | 30 parts |
| Methanol | 200 parts |
| Plasticizer | 10 parts |

On the other hand, pigment compositions in place of the pigment compositions of the present invention were prepared as Comparative Examples by mixing a phthalocyanine type pigment with any one of the sulfonic acid compounds according to the conventional technique obtained in Production Example 4. Gravure inks were obtained in the same manner and the gravure inks were evaluated.

Table 1 shows results of the above Examples. Examples 1 to 3 were remarkably lower in viscosity immediately after the dispersing as compared with Comparative Examples, and Examples 1 to 3 were small in viscosity increase after 1 week at 40° C. That is, Examples 1 to 3 were excellent in flowability and stability with time and also excellent in gloss and migrationfastness.

TABLE 1

| | Pigment composition | | | Viscosity (cps) | | | |
| --- | --- | --- | --- | --- | --- | --- | --- |
| | | | Sulfonic acid compound | B type viscometer 6 rpm value | | | |
| | Phthalocyanine type pigment | No. | Added amount | Immediately after dispersing | After 1 week at 40° C. | Gloss (%) | Migration-fastness |
| Ex.1 | Lionol Blue FG-7350 (C.I. Pigment Blue 15:3, supplied by Toyo Ink Mfg. Co. ltd.) | A | 10% | 80 | 85 | 89 | Good |
| CEx. | Lionol Blue FG-7350 (C.I. Pigment Blue 15:3, supplied by Toyo Ink Mfg. Co. ltd.) | D | 10% | 4,000 | 8,000 | 65 | Slightly Good |
| CEx. | Lionol Blue FG-7350 (C.I. Pigment Blue 15:3, supplied by Toyo Ink Mfg. Co. ltd.) | E | 10% | 2,500 | 4,600 | 84 | Poor |

TABLE 1-continued

| | Pigment composition | | | Viscosity (cps) | | | |
| | | Sulfonic acid compound | | B type viscometer 6 rpm value | | | |
| | Phthalocyanine type pigment | No. | Added amount | Immediately after dispersing | After 1 week at 40° C. | Gloss (%) | Migration-fastness |
|---|---|---|---|---|---|---|---|
| Ex.2 | Lionol Green YS-07 (C.I. Pigment Green 7, supplied by Toyo Ink Mfg. Co. ltd.) | B | 8% | 70 | 80 | 84 | Good |
| CEx. | Lionol Green YS-07 (C.I. Pigment Green 7, supplied by Toyo Ink Mfg. Co. ltd.) | F | 8% | 3,200 | 7,600 | 78 | Slightly good |
| Ex.3 | Seika Fast Blue 5000P (C.I. Pigment Blue 75, supplied by Dainichi-seika sha) | C | 12% | 100 | 110 | 82 | Good |
| CEx. | Seika Fast Blue 5000P (C.I. Pigment Blue 75, supplied by Dainichi-seika sha) | G | 12% | 4,800 | 9,200 | 72 | Poor |

Ex. = Example,
CEx. = Comparative Example

What is claimed is:

1. An ink comprising a pigment composition formed of a phthalocyanine pigment which may be substituted with a chlorine atom, a bromine atom or both, and a compound of the formula (1), and $$P\text{-}[SO_3^-\cdot Fe^{n+}]_m \quad (1)$$

wherein P is a metal-free or metal phthalocyanine residue which may be substituted with a chlorine atom, a bromine atom or both, n is 2 or 3 and m is a number from 1 to 4, a vehicle for a gravure ink or a flexographic ink formed of a resin and a solvent.

2. An ink according to claim 1, wherein the amount of the compound of the formula (1) per 100 parts by weight of the phthalocyanine pigment is 0.1 to 30 parts by weight.

3. An ink according to claim 1, wherein the vehicle is a resin solution or emulsion formed of at least one resin selected from the group consisting of gum rosin, wood rosin, tall oil rosin, lime rosin, rosin ester, a maleic resin, a polyamide resin, a vinyl resin, cellulose nitrate, cellulose acetate, ethyl cellulose, chlorinated rubber, cyclized rubber, an ethylene-vinyl acetate copolymer resin, a urethane resin, a polyester resin, an alkyd resin, gilsonite, a dammar resin and shellac, and at least one solvent selected from the group consisting of hydrocarbon, alcohol, ketone, ether, ester and water.

4. An ink according to claim 1, wherein the vehicle is a resin solution formed of cellulose nitrate as the resin and alcohol and/or ester as the solvent.

* * * * *